Dec. 15, 1964 J. S. ALLEN 3,161,801

DELAY APPARATUS AND METHOD EMPLOYING ELECTRON STREAM

Filed March 31, 1960 4 Sheets-Sheet 1

JOSEPH STEVENS ALLEN

*INVENTOR*

BY [signature]

*ATTORNEY*

Dec. 15, 1964 J. S. ALLEN 3,161,801

DELAY APPARATUS AND METHOD EMPLOYING ELECTRON STREAM

Filed March 31, 1960 4 Sheets-Sheet 2

JOSEPH STEVENS ALLEN
*INVENTOR*

BY Flehr and Swain
ATTORNEY

DELAY APPARATUS AND METHOD EMPLOYING ELECTRON STREAM

Filed March 31, 1960 4 Sheets-Sheet 3

JOSEPH STEVENS ALLEN
*INVENTOR*

BY Flehr and Swain
ATTORNEY

Dec. 15, 1964 J. S. ALLEN 3,161,801

DELAY APPARATUS AND METHOD EMPLOYING ELECTRON STREAM

Filed March 31, 1960 4 Sheets-Sheet 4

JOSEPH STEVENS ALLEN
*INVENTOR*

BY Flehr and Swain
*ATTORNEY*

United States Patent Office 3,161,801
Patented Dec. 15, 1964

3,161,801
DELAY APPARATUS AND METHOD EMPLOYING ELECTRON STREAM

Joseph Stevens Allen, 87 Rosewood Drive, Atherton, Calif.

Filed Mar. 31, 1960, Ser. No. 19,013
9 Claims. (Cl. 315—39.3)

This invention relates generally to an electronic delay apparatus and method, and more particularly to an electronic delay apparatus and method suitable for introducing a rapidly variable delay to signal information extending over a broad or wide band of frequencies.

In the television art, it is often desirable to delay one signal with respect to another to thereby obtain synchronism. It may also be necessary to continuously and rapidly vary the delay of one of the signals to continuously maintain synchronism if the other signal's time base is variable.

In recording video signals on recording mediums, it may be necessary to compensate for timing errors (phase) due to variations in the relative speed between the recording medium and the transducer unit. A variable delay apparatus provides a means whereby the timing errors may be compensated by continuously varying the delay introduced by a delay means to provide an output signal which is relatively free of timing errors.

Presently available delay lines are not suitable for receiving and controllably delaying wide band signal information, that is, signal information having frequencies which extend over a broad band. Furthermore, presently available delay apparatus is not suited for rapid variation or control of the delay.

Variable delay lines are difficult to construct. Lumped constants delay lines including a plurality of sections may be made variable by providing taps and selectively connecting to the taps. However, such delay lines are bulky and are limited in the speed at which the delay can be changed. Variable delay lines employing saturable cores in which the delay is controlled by varying the saturation are relatively narrow band delay lines. The rapidity of response is limited. Delay lines employing a large number of vacuum tubes interconnected so that the delay is controlled by the Miller effect have also been constructed in the prior art. However, such lines are bulky and have a slow response. Thus, the prior art types of delay lines are, in general, narrow band and slow.

It is a general object of the present invention to provide an improved electronic delay apparatus and method.

It is another object of the present invention to provide an electronic delay apparatus suitable for use with signals having frequencies which extend over a relatively broad range.

It is still another object of the present invention to provide an electronic delay apparatus in which the delay is electronically controlled to rapidly respond to control signals.

It is still another object of the present invention to provide a wide band signal delay apparatus in which the distortions introduced in the signal information are negligible.

It is still another object of the present invention to provide a variable wide band signal delay apparatus which is simple and compact in construction, inexpensive to manufacture, easy to operate, and which does not require complicated networks for effecting rapid control of the delay.

The foregoing and other objects of the invention are, in general, achieved by modulating a stream of carriers with the signal to be delayed. The modulated stream is then employed to scan an elongated delay means. The length of delay means between the point of impingement of the modulated stream and the output determines the delay. The point of impingement of the stream may be electronically controlled as, for example, by electrostatic or electromagnetic deflection of the stream carrier.

The foregoing and other objects will become more clearly apparent from the following description taken in conjunction with the accompanying drawing.

Referring to the drawing.

Figure 1:
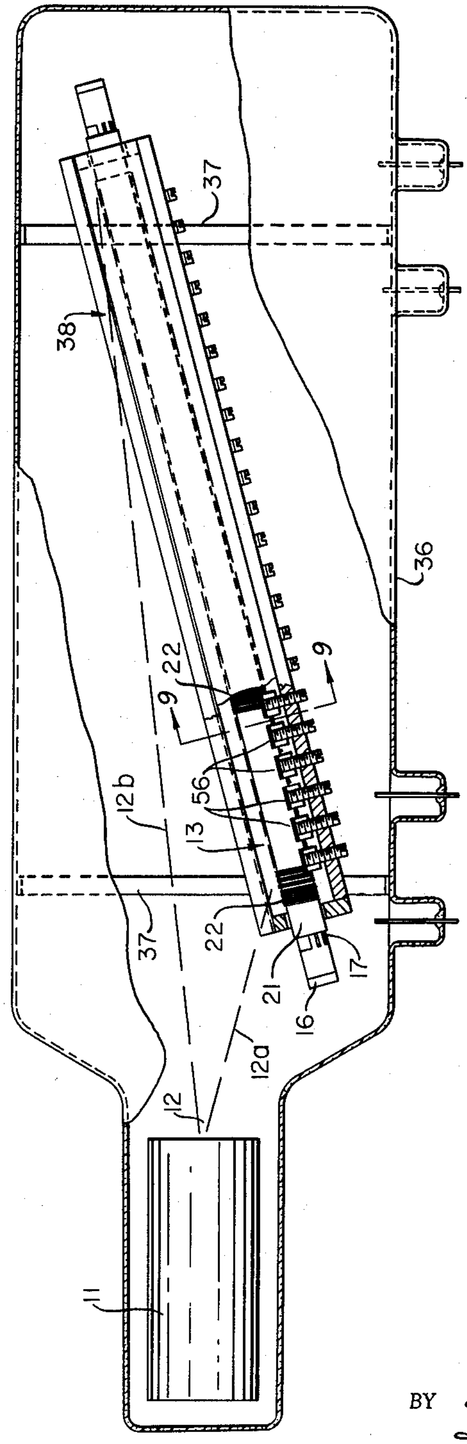
FIGURE 1 is an elevational view, partly in section, of a delay line in accordance with the invention.
Figure 2:
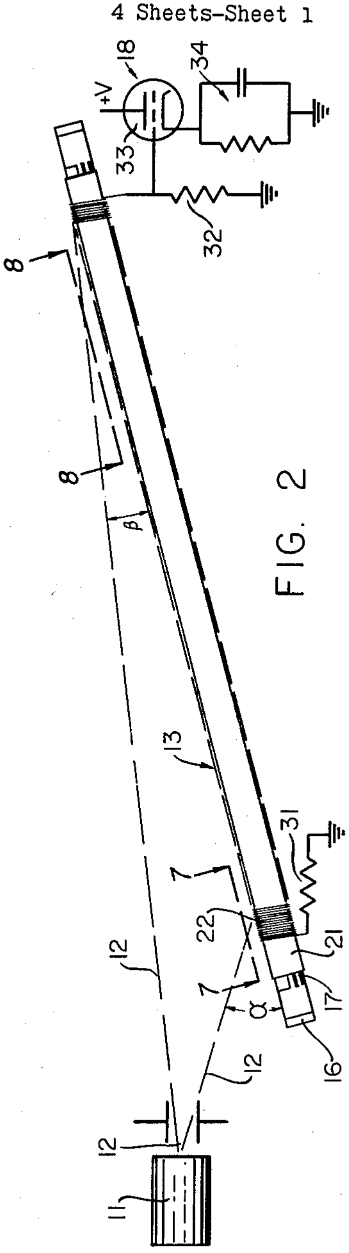
FIGURE 2 is a schematic diagram illustrating the typical circuit connections for the device shown in FIGURE 1.

Referring to FIGURES 1 and 2, there is illustrated a device in accordance with the invention. The device includes an electron gun 11 which serves to project a stream of electrons 12. The stream is directed so that it impinges upon the delay line 13. The streams **12*a* and 12*b*** show the trajectory of the electron stream for the two extremes of delay, as will be presently described. The electron stream may be deflected by electrostatic or electromagnetic means in accordance with common practice. The device illustrated includes electrostatic deflection. Magnetic fields may be employed to give a desired trajectory, as will also presently be described. The amount of delay introduced is determined by the length of line between the point of impingement of the electron stream and the output connection.

Figure 3:
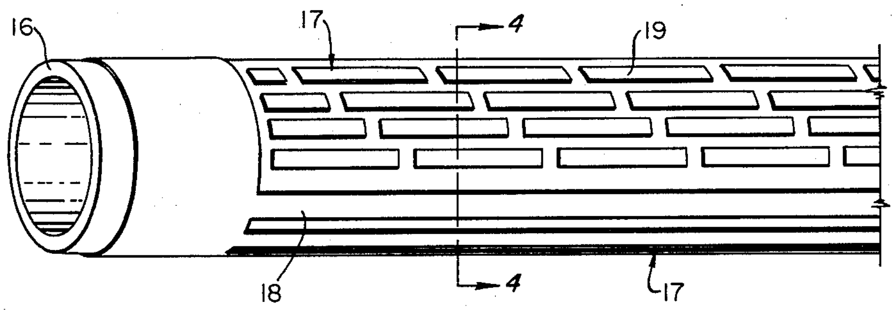
FIGURE 3 shows an interdigitated conductive pattern forming part of the delay means shown in FIGURES 1 and 2.
Figure 4:
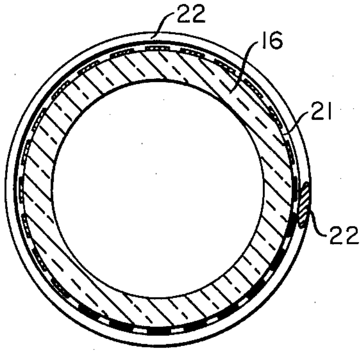
FIGURE 4 is a sectional view taken along the line 4—4 of FIGURE 3.

The delay line proper comprises a cylindrical core 16 formed of dielectric material, such as glass. There is disposed on the surface of the glass a conductive pattern 17 which is formed of relatively thin conductive material. As will be presently described, the conductive material is placed in capacitive relationship to a helically wound conductor and, in part, determines the characteristics of the line. The pattern illustrated in FIGURE 3 comprises elongated finger-like spaced conductive elements 18 which extend longitudinally on the surface of the dielectric cylinder and a plurality of smaller conductive elements 19. The conductive material may be applied by evaporation, or by paint-on techniques, and then unwanted material mechanically removed as, for example, by machining or scraping. Alternatively, the material may be applied directly in the desired pattern by silk screen techniques, or the desired pattern may be formed by printed circuit techniques.

Dielectric material 21 is disposed over the conductive pattern and serves to insulate the same from the wound conductor to be presently described. It may be in the form of film which is placed over the conductive pattern. It may also be sprayed or evaporated thereon. As will be presently apparent, the selection of the type of material and its thickness determines in part the characteristics of the delay line by fixing the distributed capacitance between the conductor and the conductive pattern.

Figure 6:
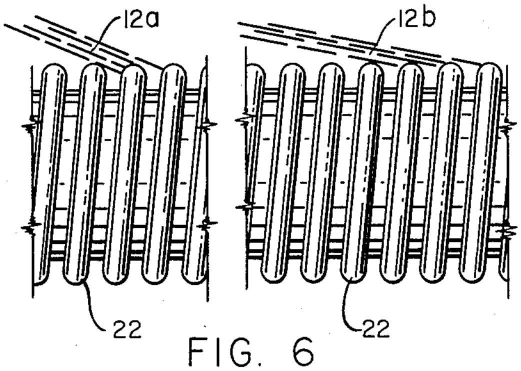
FIGURE 6 is an enlarged view of two portions of the delay line schematically illustrating the angle of incidence of carriers at the two ends.

The distributed inductive element of the delay line is formed of filamentary material 22, for example, wire, which is helically cound onto the cylinder. The adjacent turns of the material are spaced relatively close to one another whereby electrons in the electron stream strike the wire and do not impinge upon the dielectric material to give rise to secondary emission which gives scattering or does not charge the dielectric, which would also result in scattering. The spacing is selected so that for a particular angle of incidence of the stream, one turn masks the next adjacent turn. This is illustrated schematically in FIGURE 6 where the electron stream $12a$ and $12b$ is shown as it strikes the two ends of the delay line, and the figure indicates the masking of adjacent turns, one by the other.

Figure 5:
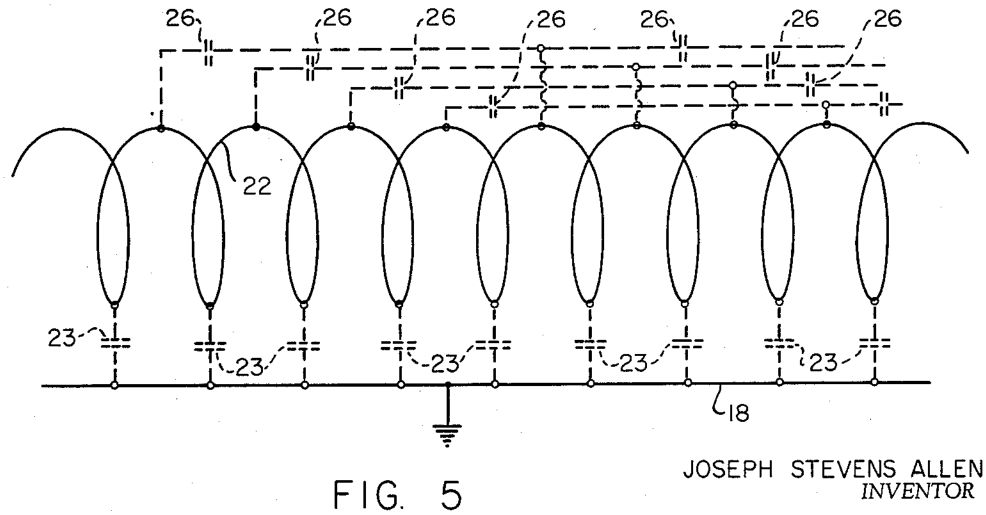
FIGURE 5 is an equivalent circuit for a delay line in accordance with the invention.

Referring to FIGURE 5, there is schematically illustrated an equivalent lumped constant circuit for the delay line 13. The filamentary helically mound material 22 forms the inductive element of the line. The elongated finger-like elements 18 are grounded and disposed in capacitive relationship to the line as schematically illustrated by the capacitors 23.

The amount of delay and characteristics of the line may be controlled by selecting the size of the filamentary material 22 forming the helical conductors, by varying the thickness of the dielectric material 21, and by changing the configuration of the elongated conductor 18. Preferably, the elongated conductors 18 are in the form of separated strips to reduce eddy current losses in the same.

In a delay line of the type illustrated there is the problem of distributed mutual inductance between adjacent portions of the line. Such coupling affects the phase response of the line and gives different delay for different frequencies. It is particularly troublesome at the higher frequencies. In accordance with the present invention, the mutual inductance is compensated by mutual capacitance. The separated conductive elements 19 are not connected to ground and they give rise to a mutual capacitance between turns as illustrated by the capacitors 26, FIGURE 5. The desired mutual capacitance can be varied to suit by altering the extent and size of the elements.

Thus, there has been described a delay line 13 which can be tailored to give a desired frequency response and delay, and which is compact and relatively simple in construction.

As illustrated in FIGURE 2, one end of the delay line is resistively terminated by the resistor 31, and the other end is connected to the output load resistor 32. The voltage appearing across the load resistor 32 is applied to an amplifier stage 18 which may, for example, comprise a vacuum tube 33 with a partially bypassed cathode circuit 34. The bypass circuit 34 is employed to peak the output for the higher frequencies to thereby compensate for high frequency losses in the delay line 13.

Figures 9, 10:
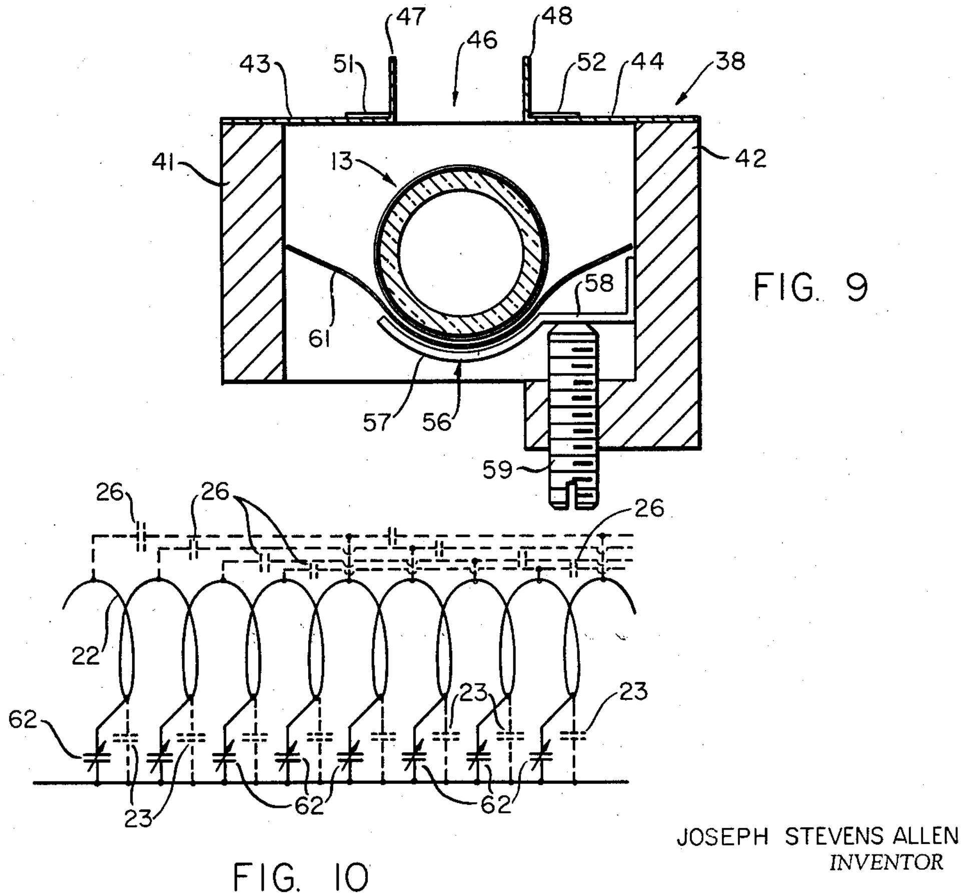
FIGURE 9 is an enlarged view taken along the line 9—9 of FIGURE 1.
FIGURE 10 is an equivalent circuit of the delay line including the variable tuning means shown in FIGURES 1 and 9.
Figure 11:
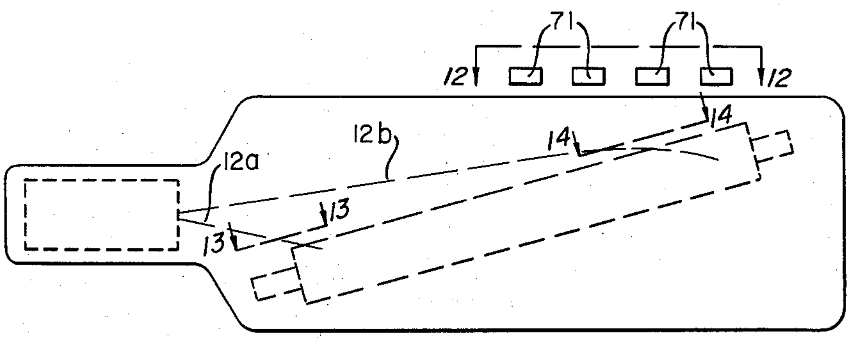
FIGURE 11 is an elevational view of a line including magnetic deflection.
Figure 12:
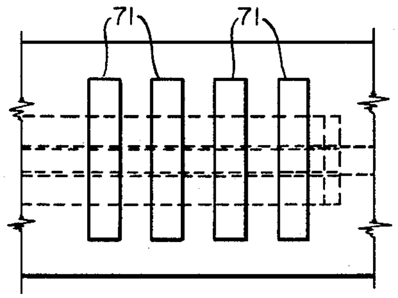
FIGURE 12 is a view taken along line 12—12 of FIGURE 11.
Figure 13:
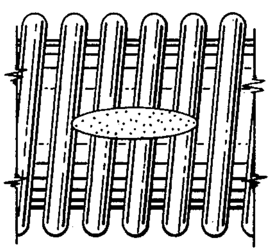
FIGURE 13 shows the electron pattern at the gun end for FIGURE 11; the view is taken generally at line 13—13 of FIGURE 11.
Figure 14:
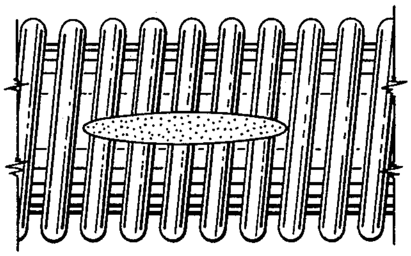
FIGURE 14 shows the electron pattern at the far end for FIGURE 11; the view is taken generally at line 14—14 of FIGURE 11.

Referring to FIGURES 1 and 9, the delay line is disposed within an evacuated envelope 36 and held by the supports 37. The line is longitudinally disposed in a shielding structure 38. The structure includes side walls 41 and 42 and spaced covers 43 and 44 attached to the walls 41 and 42, respectively, and extending towards one another to form a longitudinal slot or opening 46 which is aligned with the delay line 13. The covers include upturned ends 47 and 48. Preferably, in operation, the shield is maintained at a voltage which is slightly positive with respect to the delay line whereby secondary electrons are attracted thereto and scattering is minimized.

It will be observed that the slot must be accurately aligned with respect to the electron stream so that it passes therethrough and strikes the delay line. To aid in alignment, there are provided bands of material 51 and 52 which emits light when struck by electrons on each side of the slot 46. The material is carried on the covers 43 and 44, respectively. The delay apparatus can be easily aligned by scanning the electron beam and observing whether there is light emitted by the material. Once the structure is aligned, no light will be emitted.

It is desirable to be able to tune the delay line. For this purpose, a plurality of longitudinally spaced adjustable plates 56 is disposed below the delay line. The plates are curved at 57 to encompass the lower side of the delay line and include tabs 58 which receive adjusting screws 59. The screws are threadably received by the side wall 42. Interposed between the helical delay line and the adjustable plate 56 is dielectric material 61, for example, fibreglass cloth. The plates are grounded and provide a means for tuning the line. This is schematically illustrated by the variable capacitors 62, FIGURE 10.

Disposed within the envelope is the electron gun 11 which projects the stream of electrons. The gun includes a grid for modulating the stream in accordance with the signal information to be delayed whereby the signal information is then carried by the stream. Suitable means for focusing the beam are provided in accordance with practices well known in the art. The beam may be either electrostatically or electromagnetically deflected to scan the delay line 13.

The modulated stream transfers the signal to the delay line. Thus, the beam is acting much as a mechanical wiper applying the signal to the delay line. However, the position of the stream can be very rapidly varied.

As previously described, there are losses in the delay line. It is apparent, however, that the losses are variable, being different for different delays since more or less of the line is present in the circuit path for greater and lesser delays.

Figure 7:
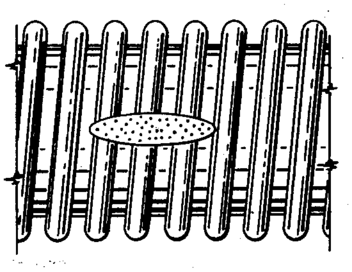
FIGURE 7 is an enlarged view taken along the line 7—7 of FIGURE 2.
Figure 8:
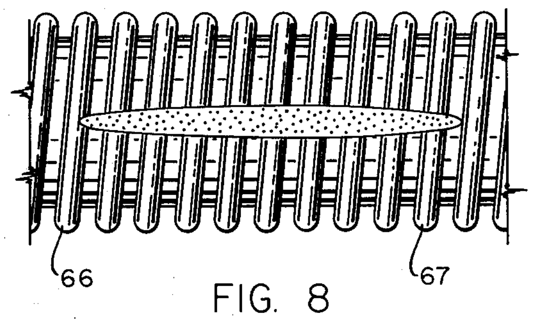
FIGURE 8 is an enlarged view taken along the line 8—8 of FIGURE 2.

In accordance with another feature of this invention, it is preferable to so dispose the delay line that the angle of incidence $\alpha$ of the stream at the electron gun end is greater than the angle of incidence $\beta$ at the other end of the delay line. The extent of the area of impingement of the stream on the delay line for the two ends is illustrated in FIGURES 7 and 8.

It is observed that the area is relatively small at the gun end. However, at the other end, it is elongated and extends over a large number of adjacent turns. Thus, the signal on the turn 66 will be delayed before it reaches the turn 67. By properly selecting the extent of the pattern of impingement, the signal striking the turn 66 can be made to cancel the same signal striking the turn 67 for a given frequency. For other frequencies, the cancellation will be less. This cancellation can be made to balance the attenuation introduced by the line to signals applied at the gun end. Thus, the result is that the frequency response remains substantially constant with variable delay.

In operation, the signal to be variably delayed is applied to the control grid to modulate the electron stream. The control signal is applied to deflect the electron stream whereby it scans the delay line. The electron stream acts as a contact, applying the signal to the delay line with the variable delay being introduced by the line.

The extent of the pattern of impingement (FIGURES 7 and 8 and related description) can be controlled by magnetic fields which will cause the beam to curve. Referring to FIGURES 11–14, there is shown a delay line which includes permanent magnets 71 disposed so that the fields cause the beam 12*b* to curve downwardly so that the angle of incidence $\beta$ is increased. The extent of the pattern is thus reduced in comparison to a delay line having no magnetic deflection. Compare, for example, FIGURES 8 and 14. It is, of course, understood that electromagnets may be used and that the positioning, configuration and the like of the magnets may be varied to give the desired beam path.

In summary then, there is provided a novel delay apparatus capable of rapidly varying delays introduced to a signal. In its broadest concept, the invention contemplates employing an electron stream to make selective contact to a delay means. A novel delay line is provided which can be constructed to respond satisfactorily to a signal extending over a broad range of frequencies. Means are provided for reducing the effects of mutual coupling in the distributed inductance, and means are provided to compensate for the variations in frequency response. The electronic delay line also includes means for simplifying the alignment of the elements forming the delay line.

I claim:

1. A delay apparatus for introducing a variable delay to a signal comprising means forming an electron stream, means for modulating the stream in accordance with the signal to be delayed, means for deflecting the electron stream, an elongated delay means adapted to delay a signal applied thereto by an amount dependent upon the point of application of the signal to the same, said elongated delay means being disposed to receive said electron stream, said deflection means serving to control the point of impingement of the electron stream on the delay means to thereby control the delay introduced by the delay means, and a shield surrounding said delay means and including a longitudinally extending slot through which the electron stream passes to strike the delay means, and means carried adjacent said slot and serving to emit light when the stream of electrons strikes the same to thereby provide means for aligning the delay means.

2. A delay apparatus for introducing a variable delay to a signal comprising means forming an electron stream, means for modulating the stream in accordance with the signal, an elongated delay means including helically wound filamentary material adapted to delay a signal applied thereto by an amount determined by the point of application of the signal thereto, said helically wound filamentary material being disposed with one end adjacent said means forming the electron stream and the other end remote therefrom to receive said electron stream to have the signal carried by the same applied thereto and so arranged that the electron stream forms a greater angle with the axis of the helix at one end of the helix formed by the helically wound filamentary material than at the other end so that the frequency response remains substantially constant with variable delay, and means for deflecting the electron stream to control the point of impingement of the modulated electron stream to control the delay introduced by the delay means.

3. Apparatus as in claim 2 in which the delay line additionally comprises a cylindrical member formed of dielectric material, electrically conductive material disposed on discreet portions of said cylinder, and dielectric material disposed over said electrically conductive material, said helically wound filamentary material being wound onto the cylinder and in capacitive relationship with the electrically conductive material.

4. Apparatus as in claim 3 wherein the conductive material is disposed on said cylinder in elongated longitudinally extending strips and a plurality of electrically conductive portions extending on said cylinder between selected turns of the helically wound filamentary material whereby mutual capacitance is provided.

5. Apparatus as in claim 2 wherein said delay means is disposed within a shield including an elongated longitudinal slot, and light emitting material is disposed along each edge of the slot to emit light when the electron stream strikes the same to thereby provide means for aligning the delay apparatus.

6. A delay apparatus for introducing a variable delay to a signal comprising means forming an electron stream, means for modulating the stream in accordance with the signal, means for deflecting the electron stream, an elongated delay line including a cylindrical member formed of dielectric material and including a ground plane, electrically conductive material disposed in discreet portions on said cylinder, dielectric material disposed over said electrically conductive material, helically wound filamentary material wound onto the cylinder in capacitive relationship with said ground plane and portions of electrically conductive material, and a plurality of longitudinally spaced conductive members disposed in capacitive relationship with said helically wound filamentary material to thereby provide means for tuning the delay line.

7. Apparatus as in claim 6 wherein the conductive material is disposed on said cylinder in elongated longitudinally extending strips and a plurality of electrically conductive portions extending on said cylinder between selected turns of the helically wound filamentary material whereby mutual capacitance is provided.

8. A delay apparatus for introducing a variable delay to a signal applied thereto comprising means forming an electron stream, means for modulating the stream in accordance with the signal to be delayed, an elongated delay means adapted to delay a signal applied thereto by an amount dependent upon the point of application of the signal to the same, said elongated delay means comprising a transmission line including a helically wound filamentary material and electrically conductive means disposed in capacitive relationship with the filamentary material, said electrically conductive means including elongated longitudinal conductive strips and a conductive segment providing mutual capacitance between selected turns of the helically wound filamentary material.

9. A delay apparatus for introducing a variable delay to a signal comprising means forming an electron stream, means for modulating the stream in accordance with the signal, means for deflecting the electron stream, an elongated delay line including a ground plane and helically wound filamentary material in capacitive relationship thereto disposed to receive said electron stream, a plurality of longitudinally spaced conductive members disposed in capacitive relationship with said helically wound filamentary material to thereby provide means for tuning the delay line, said delay line being disposed within a shield including an elongated longitudinal slot, and light emitting material disposed along each edge of the slot to emit light when the electron stream strikes the same to thereby provide means for aligning the delay apparatus.

References Cited in the file of this patent

UNITED STATES PATENTS

| | | |
|---|---|---|
| 2,463,710 | Montani | Mar. 8, 1949 |
| 2,519,443 | Diemer et al. | Aug. 22, 1950 |
| 2,825,841 | Convert | Mar. 4, 1958 |
| 2,878,412 | Lally | Mar. 17, 1959 |
| 2,906,914 | Cutler | Sept. 29, 1959 |
| 2,941,110 | Yando | June 14, 1960 |

FOREIGN PATENTS

| | | |
|---|---|---|
| 653,062 | Great Britain | May 9, 1951 |